UNITED STATES PATENT OFFICE.

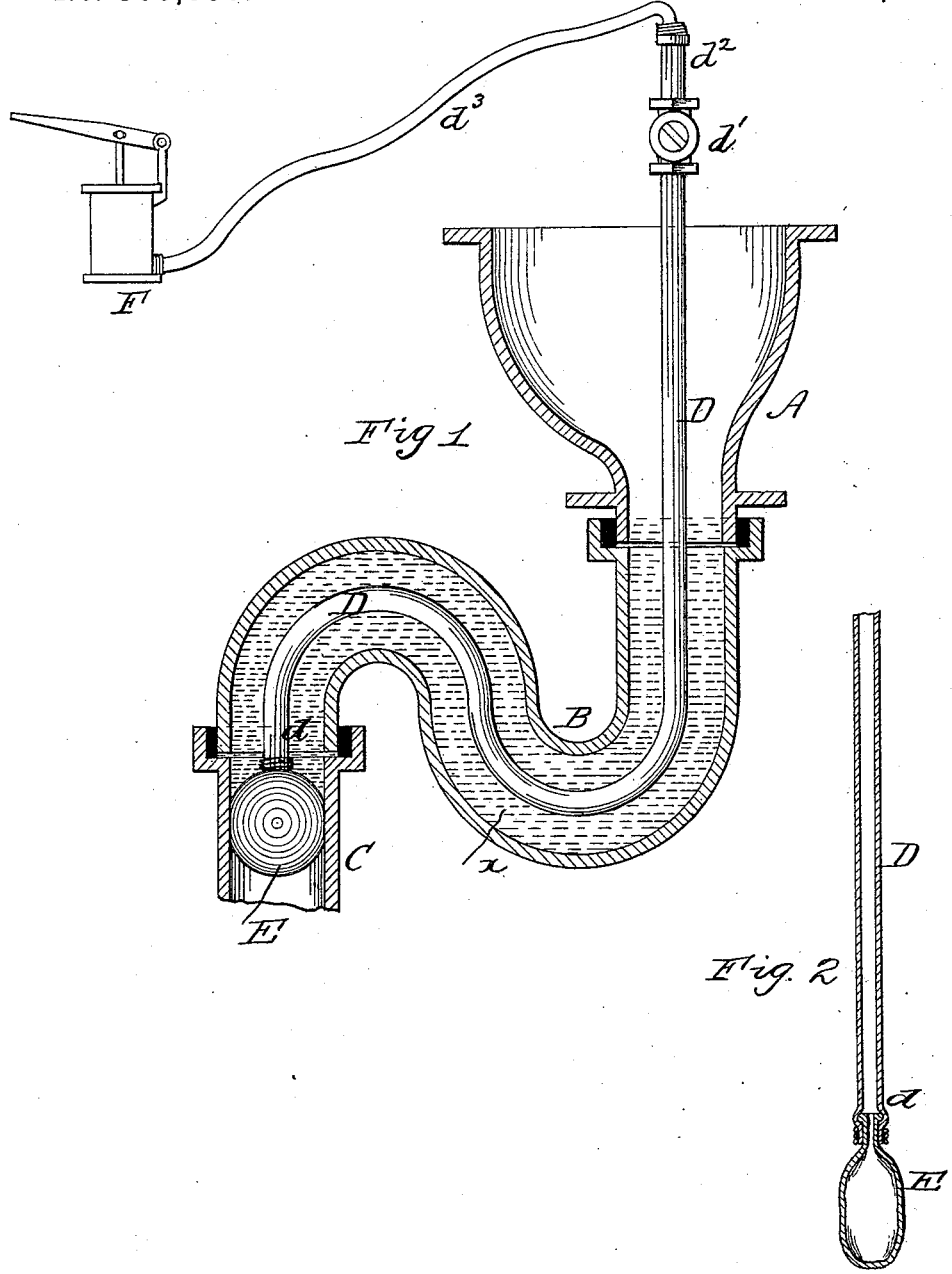

CHARLES F. PIKE, OF PHILADELPHIA, PENNSYLVANIA, ASSIGNOR TO THE NATIONAL ANTI-SEWER GAS COMPANY, OF SAME PLACE.

DISINFECTING AND CLEANSING WATER-CLOSETS.

SPECIFICATION forming part of Letters Patent No. 300,636, dated June 17, 1884.

Application filed January 13, 1883. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Disinfecting and Cleansing Water-Closets, of which the following is a specification, reference being had therein to the accompanying drawings, wherein—

Figure 1 is a sectional view of a water-closet bowl and trap, and an elevation of mechanism for cleansing and disinfecting such fixtures in accordance with my invention; and Fig. 2 is a broken detail section.

My invention has relation to cleansing and disinfecting the traps of water-closets, soil-pipes, and other similar fixtures, and has for its object to provide a simple and inexpensive apparatus for accomplishing such result, whereby the traps and soil-pipe, &c., are quickly and thoroughly cleansed and deodorized without removing them from their location or disarranging the fixtures to which they are attached. The disinfecting of such fixtures is accomplished by first introducing a plug or stopper into the outlet of the trap or soil-pipe to close or seal the same, then filling such fixtures with a disinfecting-fluid, which dissolves or loosens and separates all foreign or fecal matter adhering to their walls or surfaces, then withdrawing such mechanism or plug, and then flushing or washing said trap or pipe with a flow of water or disinfecting-fluid. The apparatus consists of any suitable or desirable means for sealing or stopping up the outlet of the fixture designed to be cleansed; but I prefer to employ a hollow air-tight collapsible ball or bag attached to the end of a rubber or other flexible pipe, so that when inserted into the fixture to be cleansed said ball and pipe will readily pass therethrough or conform to the outline thereof. Said pipe at its opposite end is designed to be connected with an air-pump or a reservoir of compressed air or other suitable medium for inflating said bag or ball and cause it to completely close the outlet of the trap or soil-pipe.

Referring to the accompanying drawings, A represents a water-closet bowl or hopper, B the trap therefor, and C the soil-pipe. D indicates a tube, of rubber, lead, or other suitable material, having a bag or ball, E, of rubber, skin, oiled paper, or equivalent air-tight material, attached thereto at its end $d$, and is provided with a cock, $d'$. The end $d^2$ of said tube D has a connection, $d^3$, with pump F, or the latter may be directly secured to the former. The bag or ball E is made of the above-enumerated or other suitable material which is air-tight and capable of collapsing, as shown in Fig. 2.

The operation is as follows: The bag E and pipe D are inserted into and advanced through trap B until the bag reaches the outlet of the trap. The end $d^2$ of said pipe is connected with air-pump F and cock $d'$ opened. The pump being operated, air is forced through pipe D to bag E, which is thereby inflated and forms a plug or stopper for filling up or sealing the bore or outlet of said trap, so that nothing can pass out thereof. After the bag is inflated the cock $d'$ is closed to retain the confined air in pipe D and bag E, to hold the latter in a state of inflation. A charge of disinfectant liquid is then poured into the trap, as indicated at $x$, which dissolves or separates all the foreign or fecal matter adhering to its walls. Such liquid may be composed of any of the well-known disinfectants—like corrosive sublimate, sulphur, carbolic acid, &c.—and is permitted to remain in the trap until a thorough disintegration or separation of the foreign matter is effected, after which the pump F is disconnected from pipe D, or cock $d'$ is opened, whereupon the air in pipe D escapes and bag E collapses. Said parts are then withdrawn from the trap. The disinfectant fluid and dissolved or separated fecal matter having previously passed out of said trap, the latter is then flushed or washed out with water or a charge of fluid disinfectant. In lieu of pump F, a reservoir of compressed air, or air and water, or effervescing compounds, or other suitable means, may be employed to inflate the bag E. So, too, instead of using a disinfecting-liquid to eat away the foreign or fecal mater, any other suitable material or liquid which possesses the capability of absorbing such matter may be employed. Again, such liquid during the time it is standing in trap may be agitated in any suitable manner to hasten the process of separation or disintegration of the fecal matter.

I have shown and described my invention as being especially adapted for cleansing the traps of water-closets; but it is evident that the traps of soil-pipes, wash-stands, or stench-traps generally, or the soil-pipes or other conveyers for fecal matter, may be cleansed therewith with equal facility.

While I have shown and described the use of the ball or bag E and means for inflating the same to cause it to seal the outlet of the trap, I do not confine myself thereto, as any other suitable appliance which will perform such result may be used therefor.

What I claim is—

1. In an apparatus for cleaning water-closet traps, soil-pipes, &c., a removable sealing device adapted to be placed through an inlet at any point within said fixtures without removing the parts, and means, substantially as described, for holding said sealing device at any desired point.

2. In an apparatus for cleansing water-closet traps, soil-pipes, &c., the combination of a pipe, D, having cock $d'$, and an air-tight collapsible ball or bag, E, with means, substantially as described, for inflating said ball or bag, and maintaining it in such condition, for the purpose set forth.

In testimony whereof I affix my signature in presence of two witnesses.

CHARLES F. PIKE.

Witnesses:
S. J. VAN STAVOREN,
CHAS. F. VAN HORN.